United States Patent
Brown et al.

(10) Patent No.: US 8,285,572 B2
(45) Date of Patent: Oct. 9, 2012

(54) SYSTEM AND METHOD FOR SOLUTION ORDERING BY FEDERATION OF ORDER MANAGEMENT SYSTEMS AND USE OF SOLUTION RECORDS

(75) Inventors: David W. Brown, Raleigh, NC (US); Denise E. Frey, Rochester, MN (US); Elizabeth S. Murphy, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/172,241

(22) Filed: Jul. 13, 2008

(65) Prior Publication Data

US 2010/0010850 A1    Jan. 14, 2010

(51) Int. Cl.
*G06F 17/50* (2006.01)
(52) U.S. Cl. .............. 705/7; 705/26; 705/30; 705/1; 705/37; 705/29
(58) Field of Classification Search .............. 705/7, 26, 705/30, 1, 29, 37
See application file for complete search history.

(56) References Cited

U.S. PATENT DOCUMENTS

| | | | |
|---|---|---|---|
| 6,006,195 A * | 12/1999 | Marchak et al. | 705/7.15 |
| 6,519,571 B1 * | 2/2003 | Guheen et al. | 705/14.66 |
| 6,882,981 B2 | 4/2005 | Philippe et al. | |
| 7,055,149 B2 * | 5/2006 | Birkholz et al. | 717/172 |
| 7,065,499 B1 * | 6/2006 | Seth et al. | 705/26.5 |
| 7,761,377 B2 * | 7/2010 | Meier et al. | 705/40 |
| 2002/0138316 A1 * | 9/2002 | Katz et al. | 705/7 |
| 2002/0152210 A1 | 10/2002 | Johnson et al. | |
| 2002/0178044 A1 * | 11/2002 | Bicknell et al. | 705/9 |
| 2003/0033179 A1 * | 2/2003 | Katz et al. | 705/7 |
| 2004/0128378 A1 | 7/2004 | Blakley, III et al. | |
| 2004/0128546 A1 | 7/2004 | Blakley, III et al. | |
| 2006/0178898 A1 | 8/2006 | Habibi | |
| 2006/0235771 A1 | 10/2006 | Oberoi | |
| 2007/0295803 A1 * | 12/2007 | Levine et al. | 235/379 |
| 2009/0006156 A1 * | 1/2009 | Hunt et al. | 705/7 |
| 2010/0241538 A1 * | 9/2010 | Meier et al. | 705/31 |

OTHER PUBLICATIONS

"Portable Enterprise Collaboration Contexts"; Bose, S; Ennai, A; Sohi, S; 2005 International Conference on Collaborative Computing: Networking, Applications and Worksharing; Dec. 19-21, 2005.
"Seamlessly Integrating Business Components into Existing Third-Party Software Packages"; RD 11-2001; n451144; p. 1957.

* cited by examiner

*Primary Examiner* — Vanel Frenel
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art with respect to solution order processing and provide a novel and non-obvious method, computer system and computer program product for processing solution orders using solution records. In one embodiment of the invention, a method for solution ordering across disparate order and contract management systems in a manufacturing environment can be provided. The method can include receiving a request for a solution from a customer, identifying a solution that satisfies the request for a solution, determining a solution order for the identified solution, generating a solution record for the solution order and assigning a solution record number to the solution record. The method can further include populating the solution record with product identification numbers received from multiple product lines in the manufacturing environment.

20 Claims, 2 Drawing Sheets

SYSTEM AND METHOD FOR SOLUTION ORDERING BY FEDERATION OF ORDER MANAGEMENT SYSTEMS AND USE OF SOLUTION RECORDS

BACKGROUND OF THE INVENTION

1. Field of the Invention

The present invention relates to solution ordering processes, and more particularly to methods and systems for processing solution orders by federating existing disparate order and contract management systems by creating and utilizing dynamic solution records.

2. Description of the Related Art

Integrated customer solutions spending is estimated to comprise more than 60% of the overall information technology (IT) market, and is growing at about 9% annually; however, current supply chain systems are not designed to support the ordering, fulfillment and delivery of integrated solutions. In general, customer solutions can be described as a customized combination of products, assets, and services. In many cases, the customer solutions and their designs are fairly unique. Today solutions are ordered, fulfilled, and delivered as piece parts. As a consequence, there is very little reuse of proven patterns and customized solutions because there are a lack of market data analytics that describe the systems, software, hardware, assets or services being sold together.

In addition, different versions and modifications of a solution are difficult to manage. There is no tooling to manage solution lifecycles or the components that comprise them. Even when software applications, hardware, or executable logic are listed based upon function and dependencies, a software vendor (SV) or system integrator (SI) still has to manually select the individual parts or components to assemble a solution for a business or infrastructure problem. Consequently, solution creation and assembly occurs on a micro-level. There is no utilization of specific solutions for business or infrastructure problems that have been previously tested and/or successfully deployed in a customer environment on a macro-level. Without a data structure to support such tested and/or successfully deployed solutions, guided selling, licensing, cross-brand configuration, consolidated orders and consolidated invoices are not feasible.

More importantly, there is no comprehensive order fulfillment system for solutions. Current disparate legacy order management systems each process its respective order fulfillment independently and without regard for how its fellow disparate legacy order management systems fulfill their orders. For example, software fulfillment, hardware fulfillment and services fulfillment will each have their own order configurator and order management functions, as well as process that order independently of the others. In addition, multiple people with access to multiple systems are required to view data across disparate order management systems. No single user has access to all the systems in which the data is spread. As such, order status is available online for all orders, e.g., all brands; however, for a user to obtain the order status for a given solution, which may include hundreds of order numbers, each individual order number must be known for the solution components and separate queries must be created.

Another issue with the disparate legacy order management systems is the large amount of time required for the coordination of solution delivery. This large amount of time required for solution delivery coordination is primarily due to the dynamic and inter-related schedule status changes that occur, as well as the manual coordination required across a fairly large team of individuals in order to support an integrated solution delivery to the customer.

BRIEF SUMMARY OF THE INVENTION

Embodiments of the present invention address deficiencies of the art with respect to solution order processing and provide a novel and non-obvious method, computer system and computer program product for processing solution orders, generating and utilizing dynamic solution records. In one embodiment of the invention, a method for solution ordering across disparate order and contract management systems in a manufacturing environment can be provided. The method can include receiving a request for a solution from a customer, identifying a solution that satisfies the request for a solution, determining the solution orders for the identified solution, generating a solution record for the solution orders and assigning a solution record number to the solution record. The method can further include populating the solution record with product identification numbers and other related attributes, e.g., quantities, order numbers, serial numbers, contract numbers, order status and contract status, received from multiple product lines in the manufacturing environment.

In one aspect of the embodiment, the method can further include importing hardware configuration data from an order configurator, importing software pre-load indicator data from another order configurator and importing customer data from a customer record. In another aspect of the embodiment, the method can further include submitting each of multiple hardware and/or software orders of the solution order to an identified one of the multiple product lines configured to process the submitted hardware and/or software order and receiving a corresponding order number to each submitted hardware and/or software order. In another aspect of the embodiment, the method further can include registering all the appropriate contracts in an identified one of the multiple contract registration process systems.

In another embodiment of the invention, a manufacturing management data processing system can be provided. The system can include a supply chain management system coupled to a repository of solution records for different solution orders. The system also can include solution ordering logic. The logic can include program code enabled to receive a request for solution from a customer, to identify a solution that satisfies the request for solution, to determine the solution orders for the identified solution, to generate a solution record for the solution orders and to assign a solution record number to the solution record.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for solution ordering across disparate order and contract management systems that dynamically builds a solution record, which is structured for entity management use during solution delivery, deployment and post-deployment business processes. The solution ordering system leverages strategic services-oriented architecture and existing asset architecture standards while introducing a dynamically built solution record for use during delivery, and re-use after delivery.

In accordance with an embodiment of the present invention, a solution record is created to associate orders and contracts from different order management and contract management systems. In this way, the status of each individual order and contract can be pushed or pulled automatically into the solution record to "consolidate" status, which then enables the order and contract status for each order and contract in a solution to be acquired with a single query. Thereinafter, a user, e.g., a seller 120, can use a customer number, a solution record number, or any of the individual order or contract numbers to find status on all the orders and contracts for the specified solution order.

Figure 1:
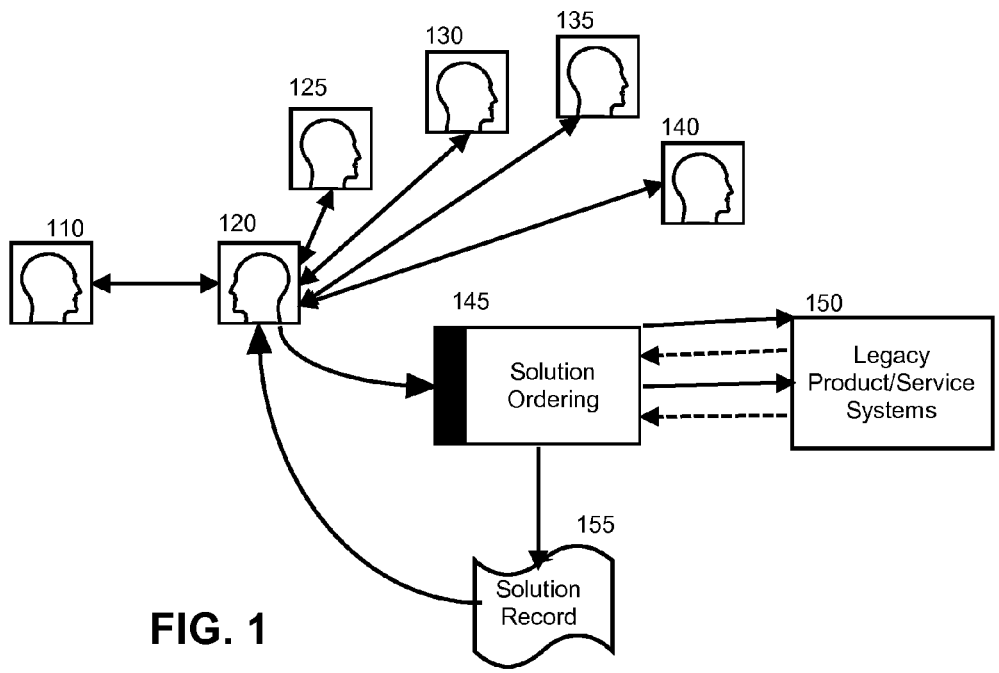
FIG. 1 is a pictorial illustration of a process for solution ordering across disparate order and contract management systems.

In illustration, FIG. 1 pictorially depicts a process for consolidating solution ordering across disparate order and contract management systems. As shown in FIG. 1, within a manufacturing process, solution record 155 can be created and configured for entity management use during solution delivery, deployment and post-deployment business processes. For example, a customer 110 in search of a solution for a specific need can contact a seller 120. The seller 120 can take the solution request of the customer 110, consult with various representatives 125, 130, 135 and 140, e.g., brand specialist sales representatives and customer support operations (CSO), of disparate legacy product/service lines and determine a customized solution as part of an overall "deal" for the customer for that solution. In embodiments, the deal can include without limitation, a final proposal, an approved configuration, an approved price and approved terms and conditions. In this manner, solution ordering logic 145 can be invoked to use solution record 155 to consolidate ordering for all legacy product/service lines 150 as well as their corresponding order and contract management systems. Consequently, solution ordering logic 145 creates a "one-stop" for all solution ordering. In other words, the solution ordering center 145 can receive the solution with its associated deal information and parse out related orders and contracts to each of the disparate legacy product/service lines 150.

In embodiments, the seller 120 provides the details of the solution order, i.e., the deal made with the customer, all the components of the solution being ordered as well as the respective contractual terms and conditions related to the solution, to the solution ordering logic 145, which can be invoked to build the solution record 155. During solution order preparation and submission, various fields of the solution record can be automatically populated with data as it is generated by the process, such as solution number, solution name, customer name, customer number(s), hardware product IDs, software product ID, hardware order numbers, software order numbers, links to proposals, links to statements of work, and respective contract registration numbers.

Figure 2:
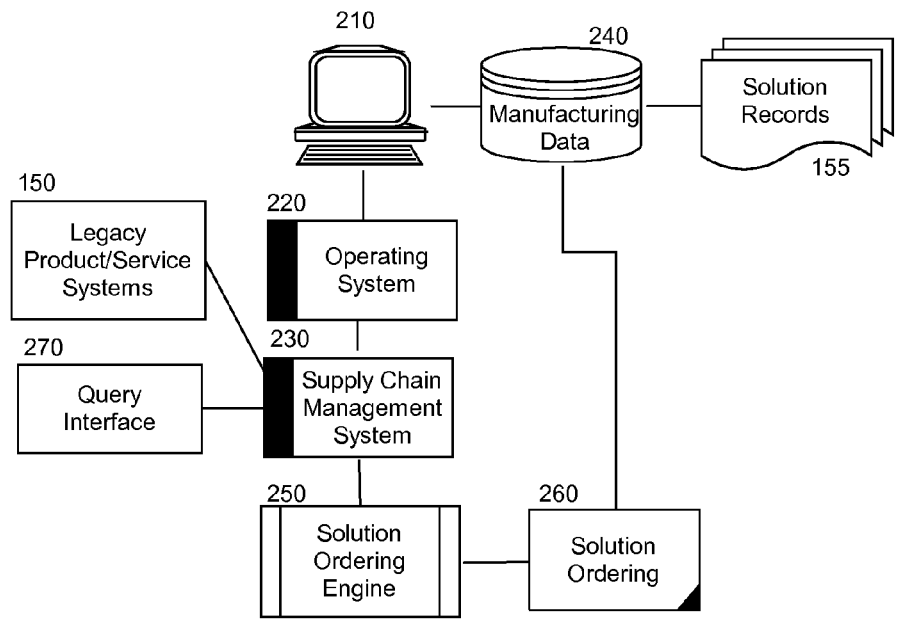
FIG. 2 is a schematic illustration of a management data processing system configured for solution ordering across disparate order and contract management systems; and, FIG. 3 is a flow chart illustrating a process for consolidating solution ordering across disparate order and contract management systems in the management data processing system of FIG. 2.

Notably, the process of consolidating solution ordering across disparate order management systems can be performed in a manufacturing management data processing system. In illustration, FIG. 2 schematically depicts a manufacturing management data processing system configured for consolidating solution ordering across disparate order and contract management systems. The system can include a host computing platform 210 including an operating system 220. The operating system 220 can support the operation of a supply chain management system 230 configured to access manufacturing data 230, including solution records 155 to process one or more solution orders for one or more solution deliveries and deployments.

Solution ordering logic 260 can be invoked by solution ordering engine 250 that can be coupled to the supply chain management system 230. The solution ordering logic 260 can include program code enabled to receive a request for a solution to a need of a customer, determine a solution and corresponding deal for the request for a solution, generate a solution order, a solution contract and a corresponding solution record, submit the solution order or contract and retrieve status of the solution order or contract during solution delivery, deployment and post-deployment stages. Legacy product/service lines and corresponding order management systems 150 can be coupled to supply chain management system 230 and controlled by the solution ordering logic 260. Independent orders and contracts for various hardware, software, services, etc. can be consolidated by the solution ordering logic 260 and the associated status of each independent order and contract can be captured to automatically populate the appropriate fields of the solution record 155. For example, during solution order preparation, hardware pricing and data records, e.g., storage and server, software pre-load indicators and quotes, customer records, proposals and statements of work (SOWs) can be imported to solution ordering logic 260. Solution ordering logic 260 can create or instantiate a solution record with a unique solution record number and populate the remaining fields of the solution record with the data from the imported data records of the legacy product/service systems 150.

In embodiments, a user, e.g., seller 120, can obtain status of the solution by accessing the solution record 155 stored in manufacturing data 240 via a query interface, e.g., a web query interface, in communication with a server, e.g., a web services server. Alternatively, the query interface and the server can be dedicated communication links for the manufacturing management data processing system. In embodiments, the development of a solution may be accomplished by identifying a predefined solution that previously had been utilized to solve the same or nearly the same customer need as now presented in the request for solution. For example, some predefined solutions for data retention, information lifecycle management, e-mail archiving or the like can be defined by a previous solution record 155 that is stored in a solution record repository, e.g., manufacturing data store 240. For the predefined solutions or currently defined custom solutions, the full configuration of the solution across all hardware, services and software product lines will be completely detailed in that solution's corresponding solution record 155 to enable manufacturing to build that identified solution.

Figure 3:
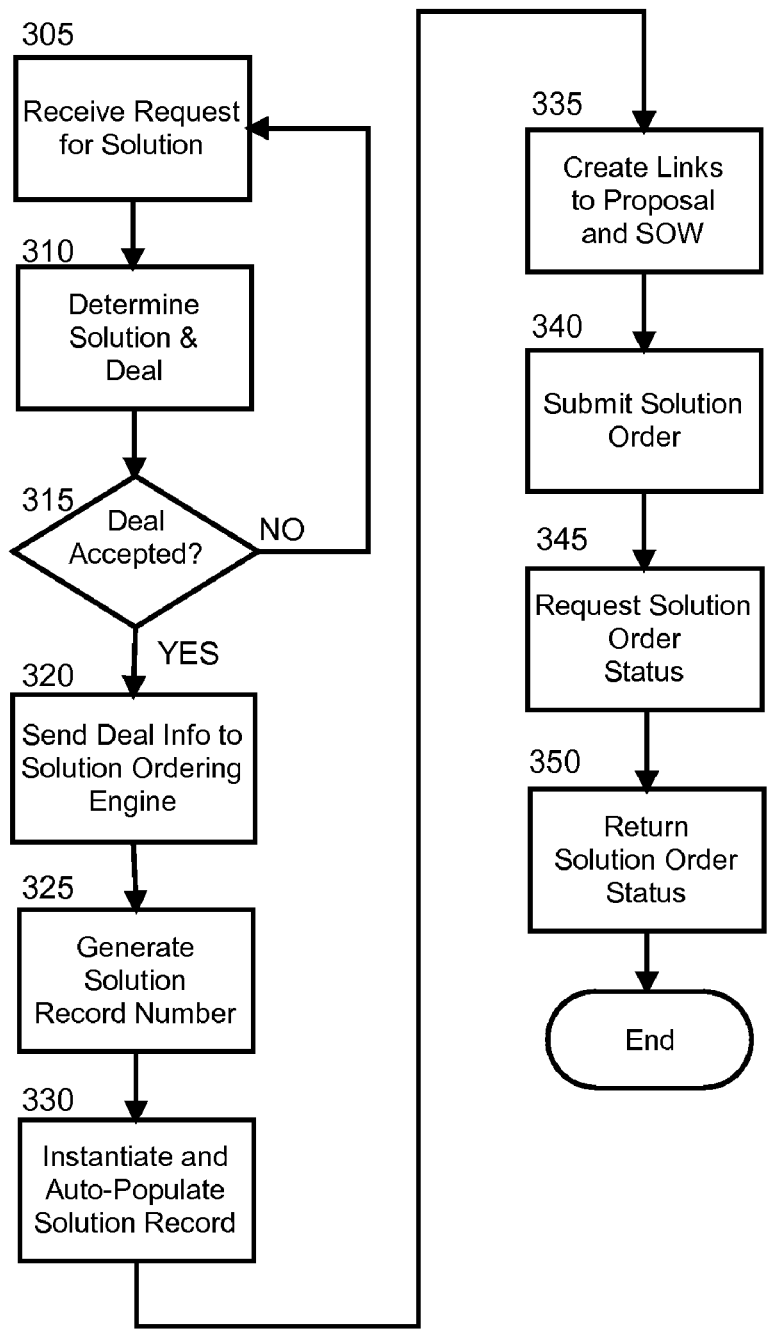

In further illustration, FIG. 3 is a flow chart illustrating a process for consolidating solution ordering across disparate order and contract management systems in the management data processing system of FIG. 2. Beginning in block 305, a seller 120 can receive a request for a solution to fulfill the need of a customer 110. A solution with a corresponding "deal" for the customer for that solution can be determined for a solution ordering process in block 310. In embodiments, the deal can include without limitation, a final proposal, an approved configuration, an approved price, customer data, approved terms and conditions. In decision block 315, it can be determined if the deal for a proposed solution has been accepted by the customer 110. If so, the deal information can be sent to the solution ordering engine 250, which can invoke solution ordering logic 260 to process the deal information in block 320 and generate a solution order. If not, the process can return to block 305 and wait to receive the next request for a solution. In block 325, a unique solution record number can be generated for the approved deal and solution order and a solution record can be created or instantiated and automatically populated in block 330. In embodiments, the creation or instantiation of the solution record can occur in several steps by calling or invoking several subroutines or services of the solution ordering logic 260, such as a create service to instantiate the solution record 155 and assign a unique solution record number, an update service to populate the solution record with deal, customer and product/services data and an artifact service to link proposal and SOW documents to the solution record 155 in block 335.

In block 340, the solution order, which can be considered as a single solution entity, can be parsed into individual orders and contracts for processing and fulfillment across the respective legacy product/service lines and their corresponding order and contract management systems 150 yet retain its solution identity in the persistent solution record 155. In this manner, the process can consolidate solution ordering and contract registration across disparate order and contract management systems; by utilizing the instantiated and populated solution record 155. Furthermore, the process advantageously enables consolidated solution order and contract status across the entire solution, as well as a single reference for retrieving that consolidated solution order and contract status, i.e., the solution record 155. In embodiments, the submission of the solution order can occur in several steps by calling or invoking several subroutines or services of the solution ordering logic 260, such as a price verification service to verify that list prices for hardware, service and software are still current, a submission service to submit hardware, service and software orders and contracts, and obtain respective order numbers and contract numbers in return. In addition, an update service to populate the solution record with hardware, services and software order and contract numbers can be called or invoked.

In block 345, solution order and contract status can be requested by a user, e.g., seller 120. Solution ordering engine 250 can invoke solution ordering logic 260 to query the appropriate legacy product/service lines database for serial numbers assigned to each hardware order number, as well as the current build status (e.g., hardware, services and software) for the entire solution entity. In addition, an update service to populate the solution record 155 with the appropriate serial numbers can be called or invoked and the associated serial numbers and solution order status can be pushed into the solution record 155.

Embodiments of the invention can take the form of an entirely hardware embodiment, an entirely software embodiment, or an embodiment containing both hardware and software elements. In a preferred embodiment, the invention is implemented in software, which includes but is not limited to firmware, resident software, microcode, offerings that include other services and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Examples of a propagation medium include a wireless transmission and receipt from one computer-readable medium to another.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for solution ordering across disparate order and contract management systems in a manufacturing environment, the method comprising:
   receiving in memory of a computing platform with at least processor, a request from a customer to purchase a solution assembled different individual parts or components manufactured by different manufacturers;
   identifying in the memory a solution that satisfies the request for a solution;
   determining by the at least one processor a solution order for the identified solution;
   generating in the memory a solution record for the solution order; and,
   assigning in the memory a solution record number to the solution record.

2. The method of claim 1, further comprising:
   populating the solution record with product identification numbers received from multiple product lines in the manufacturing environment.

3. The method of claim 1, wherein generating a solution record for the solution order further comprises:

importing hardware configuration data from an order configurator; and, importing software pre-load indicator data from another order configurator.

4. The method of claim 1, wherein generating a solution record for the solution order further comprises:

importing customer data from a customer record.

5. The method of claim 1, wherein generating a solution record for the solution order further comprises:

linking proposal and statement of wink files to the solution record.

6. The method of claim 1, further comprising:

submitting each of multiple hardware orders of the solution order to an identified one of the multiple product lines configured to process the submitted hardware order; and, receiving a corresponding order number to each submitted hardware order.

7. The method of claim 6, further comprising:

querying a hardware order management system of the identified one of the multiple product lines configured to process the submitted hardware order; and, retrieving a hardware serial number assigned to the hardware older number.

8. The method of claim 1, further comprising:

submitting each of multiple software orders of the solution order to an identified one of the multiple product lines configured to process the submitted software order; and, receiving a corresponding order number to each submitted software order.

9. The method of claim 1, further comprising:

querying the order and contract management systems of multiple product lines for hardware build and delivery status.

10. The method of claim 9, wherein querying the order and contract management systems of multiple product lines for hardware build and delivery status includes accessing the order management systems of the multiple product lines via a web query interface.

11. The method of claim 1, further comprising:

querying the order management systems of multiple product lines for software delivery status.

12. The method of claim 1, further comprising:

submitting each of multiple service contracts of the solution order to an identified one of the multiple service lines configured to process the submitted services contract; and, receiving a corresponding contract number to each submitted services contract.

13. The method of claim 1, further comprising:

querying the contract management systems of multiple service lines for contract status.

14. A manufacturing management data processing system comprising:

a supply chain management system coupled to a repository of solution records for different solution orders; and, solution ordering logic comprising program code executing in memory of a computing platform and enabled during execution in the memory of the computing platform to receive a request from a customer to purchase a solution assembled different individual parts or components manufactured by different manufacturers, to identify a solution that satisfies the request for a solution, to determine a solution order for the identified solution, to generate a solution record for the solution order and to assign a solution record number to the solution record.

15. A computer program product comprising a computer usable storage medium storing computer usable program code for processing an incoming order for equipment, the computer program product comprising:

computer usable program code for receiving a from a customer to purchase a solution assembled different individual parts or components manufactured by different manufacturers;

computer usable program code for identifying a solution that satisfies the request for a solution;

computer usable program code for determining a solution order for the identified solution;

computer usable program code for generating a solution record for the solution order; and, computer usable program code for assigning a solution record number to the solution record.

16. The computer program product of claim 15, further comprising:

computer usable program code for populating the solution record with product identification numbers received from multiple product lines in the manufacturing environment.

17. The computer program product of claim 15, wherein the computer usable program code for generating a solution record for the solution order further comprises:

computer usable program code for importing hardware configuration data from an order configurator; and, computer usable program code for importing software pre-load indicator data from another order configurator.

18. The computer program product of claim 15, wherein the computer usable program code for generating a solution record for the solution order further comprises:

computer usable program code for linking proposal and statement of work files to the solution record.

19. The computer program product of claim 15, further comprising:

computer usable program code for submitting each of multiple hardware orders of the solution order to an identified one of the multiple product lines configured to process the submitted hardware order; and, computer usable program code for receiving a corresponding order number to each submitted hardware order.

20. The computer program product of claim 19, further comprising:

computer usable program code for querying a hardware order management system of the identified one of the multiple product lines configured to process the submitted hardware order;

computer usable program code for retrieving a hardware serial number assigned to the hardware order number; and, computer usable program cock for retrieving hardware build and delivery status on the assigned hardware order number.

* * * * *